United States Patent [19]

Ishizaki et al.

[11] Patent Number: 5,561,089
[45] Date of Patent: Oct. 1, 1996

[54] GLASS-CERAMIC FOR INFORMATION RECORDING DISK

[75] Inventors: Futoshi Ishizaki; Naoyuki Goto; Masashi Maekawa, all of Sagamihara, Japan

[73] Assignee: Kabushiki Kaisya Ohara, Japan

[21] Appl. No.: 508,490

[22] Filed: Jul. 28, 1995

[51] Int. Cl.$^6$ .......................... C03C 3/087; C03C 3/093
[52] U.S. Cl. ..................... 501/10; 501/57; 501/59; 501/67; 501/69; 501/70
[58] Field of Search .................. 501/10, 57, 59, 501/67, 69, 70

[56] References Cited

U.S. PATENT DOCUMENTS

| | | | |
|---|---|---|---|
| 4,687,750 | 8/1987 | Pinckney | 501/10 |
| 4,985,375 | 1/1991 | Tanaka et al. | 501/10 X |
| 5,028,567 | 7/1991 | Gotoh et al. | 501/10 |
| 5,330,939 | 7/1994 | Marazzi et al. | 501/10 X |
| 5,476,821 | 12/1995 | Beall et al. | 501/10 |

FOREIGN PATENT DOCUMENTS 1208343  11/1989  Japan .

*Primary Examiner*—Karl Group
*Attorney, Agent, or Firm*—Hedman, Gibson & Costigan, P.C.

[57] ABSTRACT

Glass-ceramic for information recording disks have a crystalline structure suitably used for substrate materials and the like for magnetic disks and magneto-optic disks as well as have improved surface characteristics obtained by polishing the glass, and besides the base glass thereof is excellent in melting properties and moldability thereof. The base glass composition consists essentially of ingredients of $SiO_2$-$Al_2O_3$-ZnO-MgO-CaO-SrO-BaO-$TiO_2$ system. The main crystalline phase of the glass-ceramic produced by heat-treating the base glass having a viscosity of log $\eta$=3.0 poise or less at 1250° C. is gahnite, a size of the crystal grain is within a range of from 50 to 1000 Angstrom, and a degree of surface roughness (Ra) of the polished glass-ceramic is within a range of from 0.5 to 9.0 Angstrom.

3 Claims, No Drawings

GLASS-CERAMIC FOR INFORMATION RECORDING DISK

BACKGROUND OF THE INVENTION

1. Field of the Invention

This invention relates to glass-ceramic for information recording disks having a crystallized structure used suitably for substrate materials and the like for magnetic disk and magneto-Optic disk purposes and having improved surface characteristics, and besides the raw glass thereof being excellent in melting properties and mold ability.

2. Description of the Related Art

Recently, needs for magnetic disks and magneto-optic disks as external recording media used in main frame computers, personal computers and the like is increasing, and demands for high density recording is becoming stronger and the development therefor is proceeding rapidly.

In this connection, the following characteristics are required for, e.g. substrates used for magnetic disks:

(1) In order to improve recording density of magnetic disks, there is tendency to decreasing an amount of head floating so that a disk surface must be flat and smooth.

(2) A degree of surface roughness (Ra) must be 10 Angstrom or less, and preferably from 3 to 8 Angstrom.

(3) Substrate materials for magnetic disk should have no crystalline anisotropy, no defect, and further the texture of which must be dense, homogeneous, and fine.

(4) The substrate materials must have such a mechanical strength and hardness sufficient for withstanding high-speed rotation of disks and contact with heads.

(5) The glass must not have $Na_2O$ ingredient exceeding a certain small amount, because when the glass raw material contains large amount of the $Na_2O$ ingredient, Na+ion diffuses during a process of film formation so that the resulting glass deteriorates the film characteristics.

(6) The glass must have chemical durability sufficient for withstanding washing or etching with various chemicals.

(7) Melting and molding of the glass must be easy, and must be suitable for mass production.

An aluminum alloy has heretofore been used for magnetic disk substrate but an aluminum alloy substrate gives rise to projections or a spot-like unevenness in the polishing process due to various defects inherent in the material with the result that the aluminum alloy substrate is not sufficient in flatness and surface roughness for coping with high density recording.

For solving the problem of the aluminum substrate, various magnetic disk substrates such as chemically reinforced glass are known. However, chemically reinforced glass is instable in the reinforced layer when thinning of the disk is intended. Besides, a large quantity of $Na_2O$ included in the glass adversely affects the film forming characteristic of the glass with resulting necessity for surface treatment.

Known in the art are various types of glass-ceramics as materials substituting for the aluminum alloy substrate and the chemically reinforced glass substrate For example, the $SiO_2$ $Li_2O$ system glass-ceramic disclosed in Japanese Patent Application Laid-open No. Sho 62-72547 contains lithium disilicate and lithium metasilicate as its predominant crystal phases. Since, however, the diameter of crystal grain is a large value of 3 µm or over, the surface roughness (Ra) after polishing becomes a large value of 10 Angstroms or over which makes this glass ceramic unsuitable for a disk substrate for high density recording. Japanese Patent Application Laid-open No. Hei 2-247821 discloses a glass-ceramic which contains a crystal phase having a microstructure of a sheet silicate or a chain silicate. Since, however, the crystal grain structure of this glass-ceramic is acicular or rod-like. anisotropy of the crystal causes excessive holes and pits to be produced and therefore sufficient surface roughness cannot be obtained. Besides, the crystal of this glass-ceramic contains a large quantity of $Na_2O$ ingredient so that dispersion of Na ion occurs in the film forming process which adversely affects the film characteristic.

One of the inventors of the present invention has disclosed in Japanese Patent Application Laid-open No. Hei 1-208343 a transparent glass-ceramic: of the $SiO_2$-$Al_2O_3$-ZnO-MgO-Pbo-$TiO_2$ system which has transparency and high transient temperature and low-expansion characteristics and is suitable for use as substrates of various display, solar batteries and photo-masks. In this glass-ceramic, however, sufficient improvement in melting characteristic and devitrification characteristic of the base glass have not been made and therefore this glass-ceramic is disadvantageous in press molding of a disk which is useful for manufacturing a magnetic disk substrate and also disadvantageous in a large scale production in the disk forming process.

OBJECT AND SUMMARY OF THE INVENTION

An object of the present invention is to eliminate various disadvantages involved in the above described prior art, and at the same time to satisfy the above, enumerated respective required matters, so that glass-ceramic for magnetic disks and magneto-optic disks having more excellent surface characteristics as a result of polishing the same is provided by controlling the crystalline structure and the crystalline grain of deposited crystals.

Accumulated studies and experiments made by the inventors of the present invention for achieving the above described object of the invention have resulted in a finding, which has led to the present invention, that desired glass-ceramic which is produced by heat treatment of base glass obtained by allowing CaO+SrO+BaO ingredients to be added as essential ingredients to a $Si_2$-$Al_2O_3$-ZnO system is semiopaque or translucent and the main crystalline phase thereof consists of gahnite, that when a crystal grain size of the glass-ceramic is suitably controlled, a polished surface of the glass having desired characteristics is obtained, and further that the glass is excellent in melt stability wherein the base glass is easily molded at a temperature of 1250° C. or less.

The glass-ceramic achieving the above described object of the invention is obtained by heat-treating base glass consisting in weight percent of:

| | |
|---|---|
| $SiO_2$ | 40–60% |
| $Al_2O_3$ | 7–27% |
| ZnO | 5–25% |
| MgO | 1–15% |
| CaO + SrO + BaO | 1–15% |
| in which CaO | 0–15% |
| SrO + BaO | 0–5% |
| $TiO_2$ | 1–10% |
| $B_2O_3$ | 0–5% |
| $P_2O_5$ | 0–5% |
| $ZrO_2$ | 0–2% |
| $SnO_2$ | 0–2% |
| $Li_2O + Na_2O + K_2O$ | 0–2% |

| | |
|---|---|
| $As_2O_3 + Sb_2O_3$ | 0–3% and | a fluoride of one of, or fluorides of two or more of metallic elements of the above described metallic oxides in which a total amount of F is from 0 to 5%. The main crystalline phase of the aforesaid glass-ceramic is gahnite, a crystal grain size is within range of from 50 to 1000 Angstrom, and a degree of surface roughness (Ra) of the polished glass is within a range of from 0.5 to 9 Angstrom.

The composition of the glass-ceramic according to the present invention can be expressed on the basis of the oxides as in the case of base glass. In this connection, the reasons for limiting the compositional range of the base glass as described above will be described here in below.

Namely, the $SiO_2$ ingredient is a very important ingredient for producing gahnite crystals as main crystalline phase through heat treatment of the base glass. However, if an amount of the $SiO_2$ ingredient is less than 40%, grown crystals of the resulting glass-ceramic are unstable, and the texture thereof becomes easily coarse grains, besides the chemical durability and the hardness of the resulting glass-ceramic decrease. On the other hand, if the amount exceeds 60%, melting of the base glass becomes difficult.

If an amount of $Al_2O_3$ ingredient is less than 7%, the chemical durability and the hardness of the products decrease, while if the amount exceed 27%, a tendency of devitrification of the base glass increases and the melting properties deteriorate simultaneously.

The ZnO ingredient is a very important ingredient which produces gahnite crystals together with $SiO_2$ and $Al_2O_3$ through heat treatment of the base glass, and has an advantage of maintaining the transparency while improving the hardness and heat resistance of the glass. If an amount of the ZnO ingredient is less than 5%, the above ,described advantages cannot be obtained, whereas if the amount exceeds 25%, deposited crystals of the base glass become unstable and result in coarse grains.

If an amount of the MgO ingredient is less than 1%, the base glass becomes unstable and the melting properties deteriorate simultaneously, besides the hardness of products decreases. On the other hand, if the amount exceeds 15%, the crystal grains become coarse, resulting in disappearance of transparency and easy occurrence of cracks and the like.

If an amount of the CaO ingredient exceeds 15%, the base glass is excessively stabilized so that it becomes difficult to produce a desired crystalline phase.

The CaO, SrO, and BaO ingredients have an advantage of improving melting properties and crystal liability of the base glass. If the total amount of one or two or more of the ingredients is less than ]%, the above described advantage cannot be obtained, whereas if the amount exceeds 15%, it becomes difficult to obtain desired crystals. In order to further elevate the above described advantage, more preferable is to contain all the CaO, SrO, and BaO ingredients at the same time.

The $TiO_2$ ingredient is indispensable as a nucleating agent, and if an amount thereof is less than 1%, desired crystals cannot be produced, while if the amount exceeds 10%, the base glass becomes unstable.

In addition to the above described ingredients, to the composition may be added up to 5% of $B_2O_3$ and of $P_2O_5$, up to 2% of $ZrO_2$ and of $SnO_2$, and further up to a total amount of 2% of at least one or two or more of $Li_2O$, $Na_2O$, and $K_2O$, respectively, so far as desired characteristics of the resulting glass-ceramic are not damaged.

$As_2O_3$ and $Sb_2O_3$ ingredients may be added to the composition as a clarifier in melting the base glass, and a total amount of 3% or less of one or two of these ingredients is sufficient. Furthermore, when a fluoride of one of, or fluorides of two or more of metallic elements of the above described metallic oxides are allowed to exist in the glass composition, it is efficient for regulating crystallization. However, if a total amount of F exceeds 5%, the resulting glass becomes unstable so that desired crystals cannot be obtained.

Furthermore, the glass-ceramic for information recording disks having excellent melting properties and crystallizability according to the present invention is produced from a preferable base glass composition consisting in weight percent of:

| | |
|---|---|
| $SiO_2$ | 40–60% |
| $Al_2O_3$ | 7–27% |
| ZnO | 5–25% |
| MgO | 1–15% |
| CaO + SrO + BaO | 2–15% |
| in which CaO | 1–15% |
| SrO + BaO | 0.5–5% |
| $TiO_2$ | 1–10% |
| $B_2O_3$ | 0–5% |
| $P_2O_5$ | 0–5% |
| $ZrO_2$ | 0–2% |
| $SnO_2$ | 0–2% |
| $Li_2O + Na_2O + K_2O$ | 0–2% |
| $As_2O_3 + Sb_2O_3$ | 0–3% and | a fluoride of one of, or fluorides of two or more of metallic elements of the above described metallic oxides in which a total amount of F is from 0 to 5%.

Moreover, the glass-ceramic for information recording disks according to the present invention is produced from a more preferable base glass composition consisting in weight percent of:

| | |
|---|---|
| $SiO_2$ | 40–60% |
| $Al_2O_3$ | 10–25% |
| ZnO | 10–25% |
| MgO | 5–15% |
| CaO + SrO + BaO | 4–15% |
| in which CaO | 3–15% |
| SrO + BaO | 0.5–5% |
| $TiO_2$ | 1–10% |
| $B_2O_3$ | 0–5% |
| $P_2O_5$ | 0–5% |
| $ZrO_2$ | 0–2% |
| $SnO_2$ | 0–2% |
| $Li_2O + Na_2O + K_2O$ | 0–2% |
| $As_2O_3 + Sb_2O_3$ | 0–3% and | a fluoride of one of, or fluorides of two or more of metallic elements of the above described metallic oxides in which a total amount of F is from 0 to 5%.

Furthermore, the above described glass is molten to press mold the same into a discoidal disk, thereafter the disk is cooled, then a temperature; of the cooled disk is elevated at a rate of temperature increase of from 80° to 120° C./hr, and the glass disk is held at a temperature of from 600° to 740° C. for from 3 to 15 hours to effect nucleus formation. Thereafter, a temperature of the glass disk is elevated at a rate of temperature increase of from 5° to 15° C./hr, and the disk thus treated is held at a temperature of from 750° to 900° C. for from 1 to 10 hours to crystallize the same, whereby glass-ceramic containing gahnite and having a crystal grain size within a range of from 50 to 1000 Angstrom is obtained. Moreover, the glass-ceramic is subjected to lapping and then polishing with cerium oxide in accordance with a conventional method and device whereby a degree of surface roughness (Ra) of the polished glass-ceramic can be made within a range of from 0.5 to 9.0 Angstrom.

EXAMPLES

Examples of the present invention will be described in detail here in below.

Table 1 shows compositions of the glass-ceramic for magnetic disks and magneto-optic disks according to the present invention as well as measured results of glass viscosity, devitrify inability, and degree of surface roughness (Ra) of the resulting glass-ceramic after polishing of the corresponding base glass in respective examples.

Each of base glass samples in the examples of Table 1 is produced by admixing raw materials, i.e. oxides, carbonates, nitrates etc. with each other, the admixture is molten at a temperature ranging from 1350° to 1450° C., the molten glass is deaerated, and then is agitated to homogenize the glass. The homogenized glass is clarified and thereafter is molded into a desired shape, and is cooled to obtain molded glass. Thereafter, these samples thus obtained are subjected to two-stage heat treatment, i.e. a primary heat treatment for forming crystal nuclei, and a secondary heat treatment for growing crystals, whereby desired glass-ceramic containing gahnite as a main crystalline phase is obtained.

While it is not indicated in the examples of Table 1, a size of the crystal grains is within a range of from 70 to 550 Angstrom.

TABLE 1

Unit :in weight %

| No | Examples | | |
|---|---|---|---|
| | 1 | 2 | 3 |
| $SiO_2$ | 40.0 | 40.0 | 44.0 |
| $Al_2O_3$ | 16.9 | 15.9 | 15.8 |
| ZnO | 16.1 | 16.1 | 12.2 |
| MgO | 13.0 | 10.1 | 7.5 |
| BaO | 0.7 | 1.7 | 0.9 |
| CaO | 5.8 | 8.7 | 11.2 |
| $TiO_2$ | 7.0 | 7.0 | 7.9 |
| $As_2O_3$ | 0.5 | 0.5 | 0.5 |
| The remainder | | | |
| Primary heat treatment | | | |
| Rate of temperature increase (°C./hr) | 100 | 90 | 90 |
| Nuclei forming temperatare (°C.) | 700 | 620 | 640 |
| Heat retaining time (hr) | 10 | 7 | 5 |
| Secondary heat treatment | | | |
| Rate of temperature increase (°C./hr) | 10 | 8 | 7 |
| Crystallization temperatare (°C.) | 800 | 770 | 750 |
| Heat retaining time (hr) | 2 | 4 | 6 |
| Viscosity log η(poise) at 1250° C. | 2.2 | 2.1 | 2.0 |
| Devitrifiability at 1250° C. | ○ | ○ | ○ |
| Degree of surface roughness Ra(Angstrom) | 4 | 5 | 6 |

TABLE 1-continued

Unit :in weight %

| No | Examples | | |
|---|---|---|---|
| | 4 | 5 | 6 |
| $SiO_2$ | 50.0 | 50.0 | 47.0 |
| $Al_2O_3$ | 16.5 | 14.0 | 16.9 |
| ZnO | 14.0 | 13.5 | 13.1 |
| MgO | 7.0 | 7.5 | 5.1 |
| BaO | 2.0 | 3.5 | 0.7 |
| CaO | 4.0 | 5.0 | 6.7 |
| $TiO_2$ | 6.0 | 4.0 | 6.4 |
| $As_2O_3$ | 0.5 | 0.5 | 0.5 |
| The remainder | | $B_2O_3$ 2.0 | $P_2O_5$ 3.0 |
| Primary heat treatment | | | |
| Rate of temperature increase (°C./hr) | 120 | 110 | 80 |
| Nuclei forming temperatare (°C.) | 740 | 720 | 680 |
| Heat retaining time (hr) | 15 | 13 | 8 |
| Secondary heat treatment | | | |
| Rate of temperature increase (°C./hr) | 15 | 12 | 14 |
| Crystallization temperatare (°C.) | 900 | 880 | 750 |
| Heat retaining time (hr) | 10 | 8 | 10 |
| Viscosity log η(poise) at 1250° C. | 2.7 | 2.5 | 2.3 |
| Devitrifiability at 1250° C. | ○ | ○ | ○ |
| Degree of surface roughness Ra(Angstrom) | 4 | 4 | 5 |

| No. | Examples | | |
|---|---|---|---|
| | 7 | 8 | 9 |
| $SiO_2$ | 50.0 | 48.0 | 50.0 |
| $Al_2O_3$ | 15.0 | 13.0 | 13.0 |
| ZnO | 13.5 | 13.0 | 15.0 |
| MgO | 8.0 | 6.0 | 5.5 |
| BaO | 0.5 | 4.8 | 1.0 |
| CaO | 4.0 | 10.0 | 7.0 |
| $TiO_2$ | 6.0 | 3.7 | 4.0 |
| $As_2O_3$ | 0.5 | | 0.5 |
| The remainder | SrO 0.5 $B_2O_3$ 2.0 | $P_2O_5$ 1.0 $Sb_2O_3$ 0.5 | $P_2O_5$ 3.0 $ZrO_2$ 1.0 |
| Primary heat treatment | | | |
| Rate of temperature increase (°C./hr) | 120 | 100 | 110 |
| Nuclei forming temperatare (°C.) | 740 | 720 | 720 |
| Heat retaining time (hr) | 15 | 8 | 13 |
| Secondary heat treatment | | | |
| Rate of temperature increase (°C./hr) | 12 | 10 | 8 |
| Crystallization temperatare (°C.) | 880 | 900 | 880 |
| Heat retaining time (hr) | 6 | 10 | 4 |
| Viscosity log η(poise) at 1250° C. | 2.5 | 2.4 | 2.5 |
| Devitrifiability at 1250° C. | ○ | ○ | ○ |
| Degree of surface roughness Ra(Angstrom) | 6 | 5 | 6 |

| No | Examples | | |
|---|---|---|---|
| | 10 | 11 | 12 |
| $SiO_2$ | 40.0 | 40.0 | 47.0 |

TABLE 1-continued

Unit in weight %

| | | | |
|---|---|---|---|
| $Al_2O_3$ | 10.0 | 14.0 | 10.0 |
| ZnO | 15.5 | 22.0 | 18.0 |
| MgO | 7.0 | 5.5 | 5.5 |
| BaO | 2.0 | 3.0 | 4.5 |
| CaO | 13.0 | 5.0 | 3.0 |
| $TiO_2$ | 7.5 | 4.0 | 4.5 |
| $As_2O_3$ | | | 0.5 |
| The remainder | $B_2O_3$ 4.5 $Sb_2O_3$ 0.5 | $B_2O_3$ 2.0 $P_2O_5$ 2.0 $ZrO_2$ 2.0 $Sb_2O_3$ 0.5 | $Li_2O$ 1.0 $NaO_2$ 1.0 $B_2O_3$ 3.0 $ZrO_2$ 1.0 |

Primary heat treatment

| | | | |
|---|---|---|---|
| Rate of temperature increase (°C./hr) | 80 | 90 | 120 |
| Nuclei forming temperatare (°C.) | 600 | 620 | 680 |
| Heat retaining time (hr) | 3 | 5 | 10 |

Secondary heat treatment

| | | | |
|---|---|---|---|
| Rate of temperature increase (°C./hr) | 7 | 10 | 15 |
| Crystallization temperatare (°C.) | 750 | 770 | 800 |
| Heat retaining time (hr) | 1 | 3 | 5 |
| Viscosity log η(poise) at 1250° C. | 1.8 | 1.9 | 2.2 |
| Devitrifiability at 1250° C. | O | O | O |
| Degree of surface roughness Ra(Angstrom) | 4 | 5 | 7 |

| | Comparative examples | | |
|---|---|---|---|
| No | A | B | C |
| $SiO_2$ | 50.0 | 60.0 | 71.0 |
| $Al_2O_3$ | 20.0 | 10.0 | 9.6 |
| ZnO | 13.0 | 11.0 | |
| MgO | 7.0 | 7.0 | |
| BaO | 2.0 | | |
| CaO | | | 0.4 |
| $TiO_2$ | 5.7 | 5.0 | |
| $As_2O_3$ | 0.3 | 0.3 | |
| The remainder | PbO 2.0 | PbO 5.0 SrO 1.7 | $Li_2O$ 12.0 PbO 0.9 $P_2O_5$ 1.9 $Na_2O$ 3.8 SrO 0.4 |

Primary heat treatment

| | | | |
|---|---|---|---|
| Rate of temperature increase (°C./hr) | 100 | 100 | 5 |
| Nuclei forming temperatare (°C.) | 700 | 750 | 540 |
| Heat retaining time (hr) | 5 | 5 | 5 |

Secondary heat treatment

| | | | |
|---|---|---|---|
| Rate of temperature increase (°C./hr) | 30 | 10 | 8 |
| Crystallization temperatare (°C.) | 850 | 900 | 810 |
| Heat retaining time (hr) | 3 | 5 | 2 |
| Viscosity log η(poise) at 1250° C. | 3.3 | 3.6 | 3.0 |
| Devitrifiability at 1250° C. | O | Δ | O |
| Degree of surface roughness Ra(Angstrom) | 8 | 7 | 10 |

As is apparent from Table 1, the glass-ceramic in the examples of the compositions made according to the present invention is superior in the following points to the comparative examples.

The molten glass in the examples of the present invention has lower viscosity than that of comparative examples A and B so that the glass is easily molded, and besides the glass of the present invention has more resistance to devitrification than that of the comparative examples, whereby the glass having the compositions of the examples of the invention is superior to that of the comparative examples in mass production.

The glass-ceramic in the examples of the present invention has a smaller degree of surface roughness (Ra) in comparison with that of comparative example C, so that the glass-ceramic of the present invention is excellent in the use for substrate materials of high density magnetic disks and magneto-optic disks.

In the composition of the glass-ceramic of the present invention, since the alkali ingredient is essentially 2% or less, the resulting product has chemical durability which can withstand chemical washing. Furthermore, since the base glass according to the present invention can be clarified and homogenized at a temperature ranging from 1350° to 1450° C. for from 2 to 5 hours, the melting properties of the glass are good so that it is suitable for mass production.

As mentioned above, the glass-ceramic for information recording disks such as magnetic disk, magneto-optic disk and the like according to the present invention comprises a $SiO_2$-$Al_2O_3$-ZnO-MgO-CaO-SrO-BaO-$TiO_2$ system having a specified range of composition and has a value within a desired range of degree of surface roughness (Ra) of the polished glass-ceramic. Furthermore, the glass of the present invention is remarkably improved in melting properties and resistance to devitrification as compared with those of conventional glass. Accordingly, the glass-ceramic of the present invention is easily subjected to press molding in a discoidal shaped or plate-like molding which is advantageous for producing magnetic disk and magneto-optic disk substrates, so that the substrates for magnetic disks and magneto-optic disks can be produced in an industrial scale.

It will be appreciated by those of ordinary skill in the art that the present invention can be embodied in other specific forms with out departing from the spirit or essential characteristics thereof.

The presently disclosed examples are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Glass ceramic for information recording disks obtained by heat-treating base glass consisting in weight percent of:

| | |
|---|---|
| $SiO_2$ | 40–60% |
| $Al_2O_3$ | 7–27% |
| ZnO | 10–25% |
| MgO | 1–15% |
| CaO + SrO + BaO | 2–15% |
| in which | |
| CaO | 1–14.5% |
| Sr + BaO | 0.5–5% |
| $TiO_2$ | 1–10% |
| $B_2O_3$ | 0–5% |

|                        |         |
|------------------------|---------|
| $P_2O_5$               | 0–5%    |
| $ZrO_2$                | 0–2%    |
| $SnO_2$                | 0–2%    |
| $Li_2O + Na_2O + K_2O$ | 0–2%    |
| $As_2O_3 + Sb_2O_3$    | 0–3% and | a fluoride of one of, or fluorides of two or more metallic elements of the metallic oxides selected from the group consisting of $SiO_2$, $Al_2O_3$, ZnO, MgO, CaO, SrO, BaO, $TiO_2$, $B_2O_3$, $P_2O_5$, $ZrO_2$, SnO, $Li_2O$, $Na_2O$, $K_2O$, $As_2O_3$ and $Sb_2O_3$ in which the total amount of F is from 0 to 5%, and having viscosity of log η=3.0 poise or less at 1250° C., a main crystalline phase of said glass-ceramic being gahnite.

2. Glass-ceramic for information recording disks as claimed in claim 1 wherein said base glass consists of in weight percent of:

|                  |        |
|------------------|--------|
| $SiO_2$          | 40–60% |
| $Al_2O_3$        | 10–25% |
| ZnO              | 10–25% |
| MgO              | 1–15%  |
| CaO + SrO + BaO  | 4–15%  |

|                        |            |
|------------------------|------------|
| in which CaO           | 3–[15]14.5% |
| Sr + BaO               | 0.5–5%     |
| $TiO_2$                | 1–10%      |
| $B_2O_3$               | 0–5%       |
| $P_2O_5$               | 0–5%       |
| $ZrO_2$                | 0–2%       |
| $SnO_2$                | 0–2%       |
| $Li_2O + Na_2O + K_2O$ | 0–2%       |
| $As_2O_3 + Sb_2O_3$    | 0–3% and   | a fluoride of one of, or fluorides of two or more metallic elements of the metallic oxides selected from the group consisting of $SiO_2$, $Al_2O_3$, ZnO, MgO, CaO, SrO, BaO, $TiO_2$, $B_2O_3$, $P_2O_5$, $ZrO_2$, SnO, $Li_2O$, $Na_2O$, $K_2O$, $As_2O_3$ and $Sb_2O_3$ in which the total amount of F is from 0 to 5%.

3. Glass-ceramic for information recording disks as claimed in claim 1 wherein a crystal grain size of said main crystalline phase is within a range of from 50 to 1000 Angstroms, and said glass-ceramic when polished has a degree of surface roughness (Ra) within a range of from 0.5 to 9.0 Angstroms.

\* \* \* \* \*